(12) United States Patent
Mellusi

(10) Patent No.: US 10,617,112 B1
(45) Date of Patent: Apr. 14, 2020

(54) SONIC BIRD DETERRENT APPARATUS

(71) Applicant: Robert Mellusi, Millington, NJ (US)

(72) Inventor: Robert Mellusi, Millington, NJ (US)

( * ) Notice: Subject to any disclaimer, the term of this patent is extended or adjusted under 35 U.S.C. 154(b) by 0 days.

(21) Appl. No.: 16/260,309

(22) Filed: Jan. 29, 2019

(51) Int. Cl.
*G08B 3/10* (2006.01)
*A01M 29/18* (2011.01)

(52) U.S. Cl.
CPC ......... *A01M 29/18* (2013.01); *B06B 2201/75* (2013.01)

(58) Field of Classification Search
None
See application file for complete search history.

(56) References Cited

U.S. PATENT DOCUMENTS

| | | | |
|---|---|---|---|
| 5,418,368 A * | 5/1995 | Sandell | G01V 8/10 250/353 |
| 5,892,446 A | 4/1999 | Reich | |
| 5,966,075 A * | 10/1999 | Blanks | A01M 29/06 119/712 |
| 6,396,402 B1 | 5/2002 | Berger | |
| 6,690,265 B2 | 2/2004 | Hagstrum | |
| 6,749,862 B2 | 6/2004 | Landers | |
| 7,173,534 B1 | 2/2007 | Markham | |
| 7,227,452 B1 | 6/2007 | Frost | |
| 9,521,838 B2 * | 12/2016 | Donoho | A01M 29/18 |
| 9,739,065 B1 * | 8/2017 | DeSalle | E04F 11/18 |
| 2013/0070564 A1 * | 3/2013 | Prokop | A01M 29/16 367/139 |

* cited by examiner

*Primary Examiner* — Adolf Dsouza

(57) ABSTRACT

A sonic bird deterrent apparatus for preventing birds from damaging structures and trees includes a housing having a front side separated from a rear side, a right side separated from a left side, and a top side separated from a bottom side forming an inside. A pair of rails is coupled to the housing to slidingly engage a track of a mounting bracket that is attached to a house exterior or a tree. A motion sensor is coupled through the top side of the housing and has a 180° view. A speaker, a volume control, a high frequency sound chip, a CPU, and a battery are coupled to the housing to produce a high frequency sound when the motion sensor detects movement. A power switch coupled to the housing and is in operational communication with the battery.

9 Claims, 4 Drawing Sheets

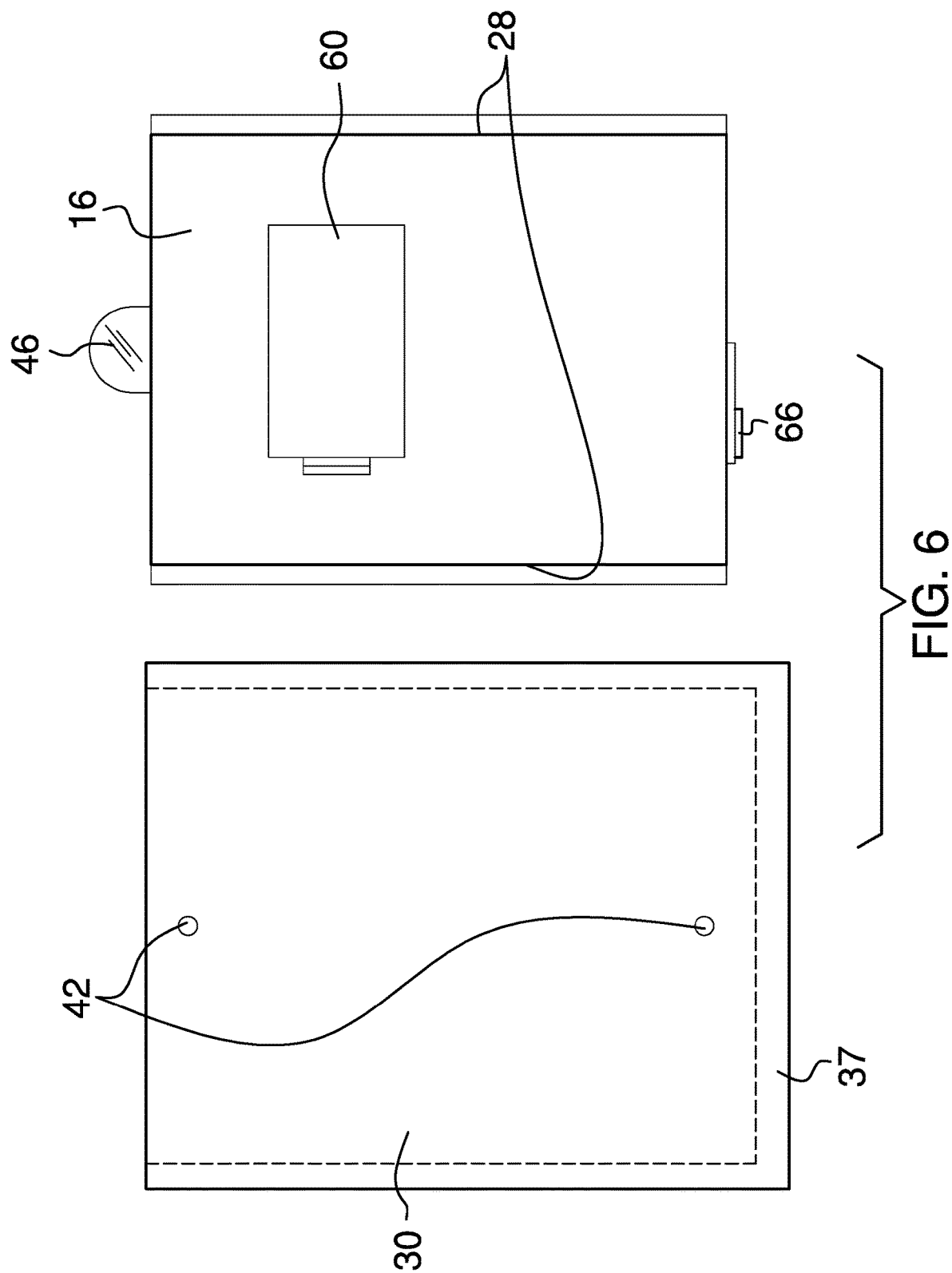

SONIC BIRD DETERRENT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to bird deterrents and more particularly pertains to a new bird deterrent for preventing birds from damaging structures and trees.

BRIEF SUMMARY OF THE INVENTION

An embodiment of the disclosure meets the needs presented above by generally comprising a housing having a front side separated from a rear side, a right side separated from a left side, and a top side separated from a bottom side forming an inside. A pair of rails is coupled to the right side and the left side adjacent the rear side. A mounting bracket has a track to slidingly receive the pair of rails and the housing and a plurality of mounting apertures configured to receive a plurality of fasteners to mount to a house exterior or a tree. A motion sensor is coupled through the top side of the housing and has a 180° view. A speaker and a volume control are coupled to the housing with the volume control in operational communication with the speaker. A high frequency sound chip is coupled to the housing. The high frequency sound chip is in operational communication with the speaker. A CPU is coupled within the inside of the housing and is in operational communication with each of the motion sensor, the speaker, the volume control, and the high frequency sound chip to produce a high frequency sound from the speaker when the motion sensor detects movement. A battery is coupled within the inside of the housing and is in operational communication with the CPU. A power switch coupled to the housing and is in operational communication with the battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a rear elevation view of an embodiment of the disclosure.

DETAILED DESCRIPTION OF THE INVENTION

Figure 1:
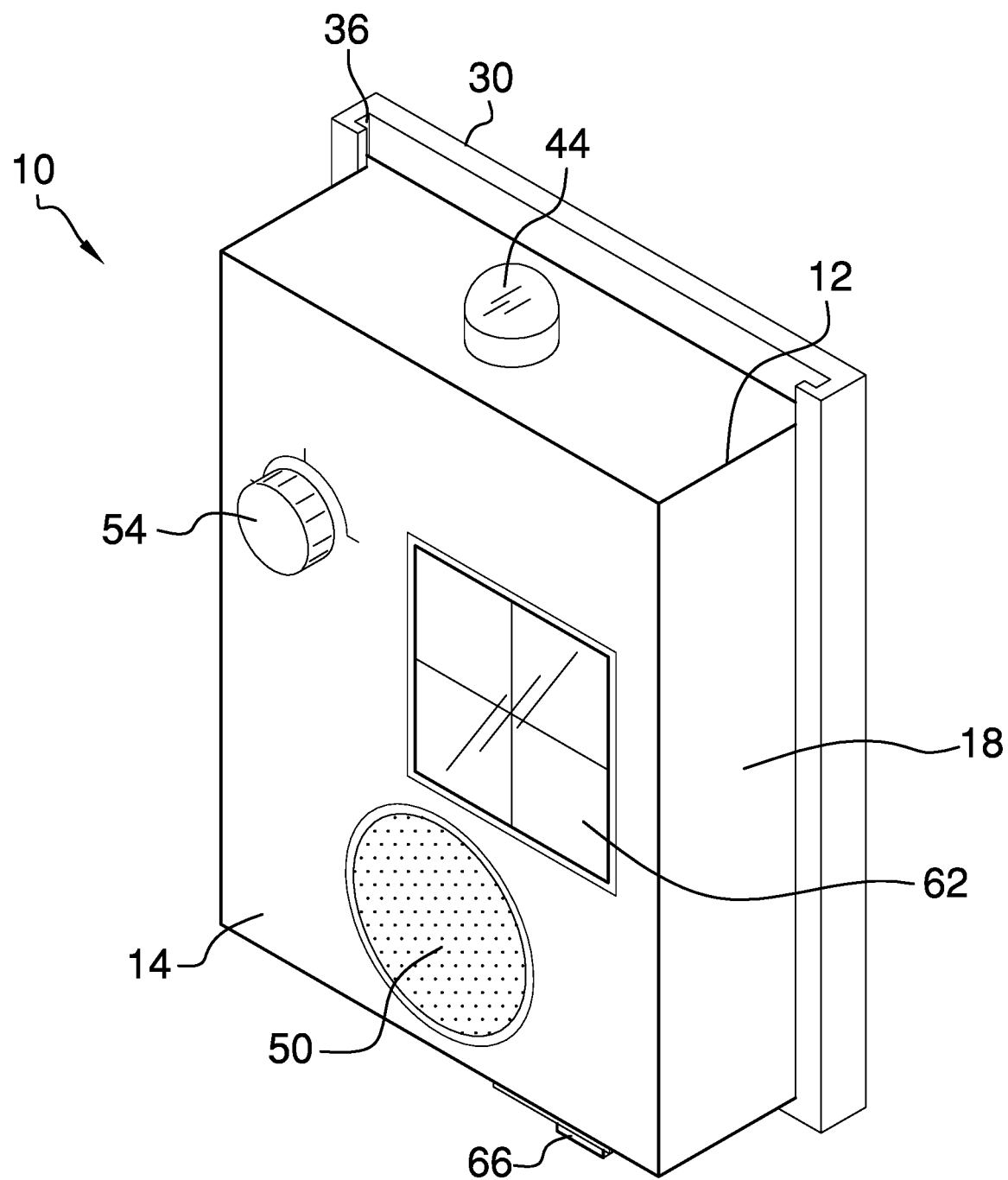
FIG. 1 is an isometric view of a sonic bird deterrent apparatus according to an embodiment of the disclosure.
Figure 2:
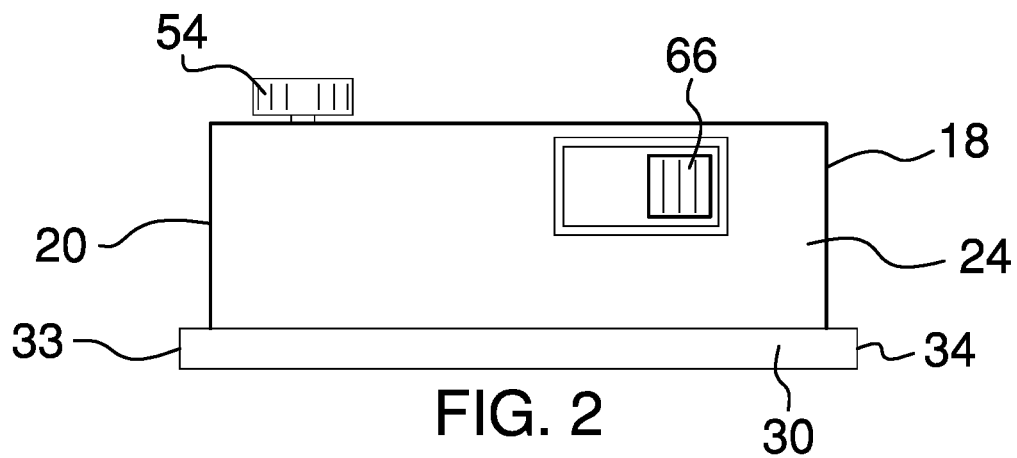
FIG. 2 is a bottom plan view of an embodiment of the disclosure.
Figure 3:
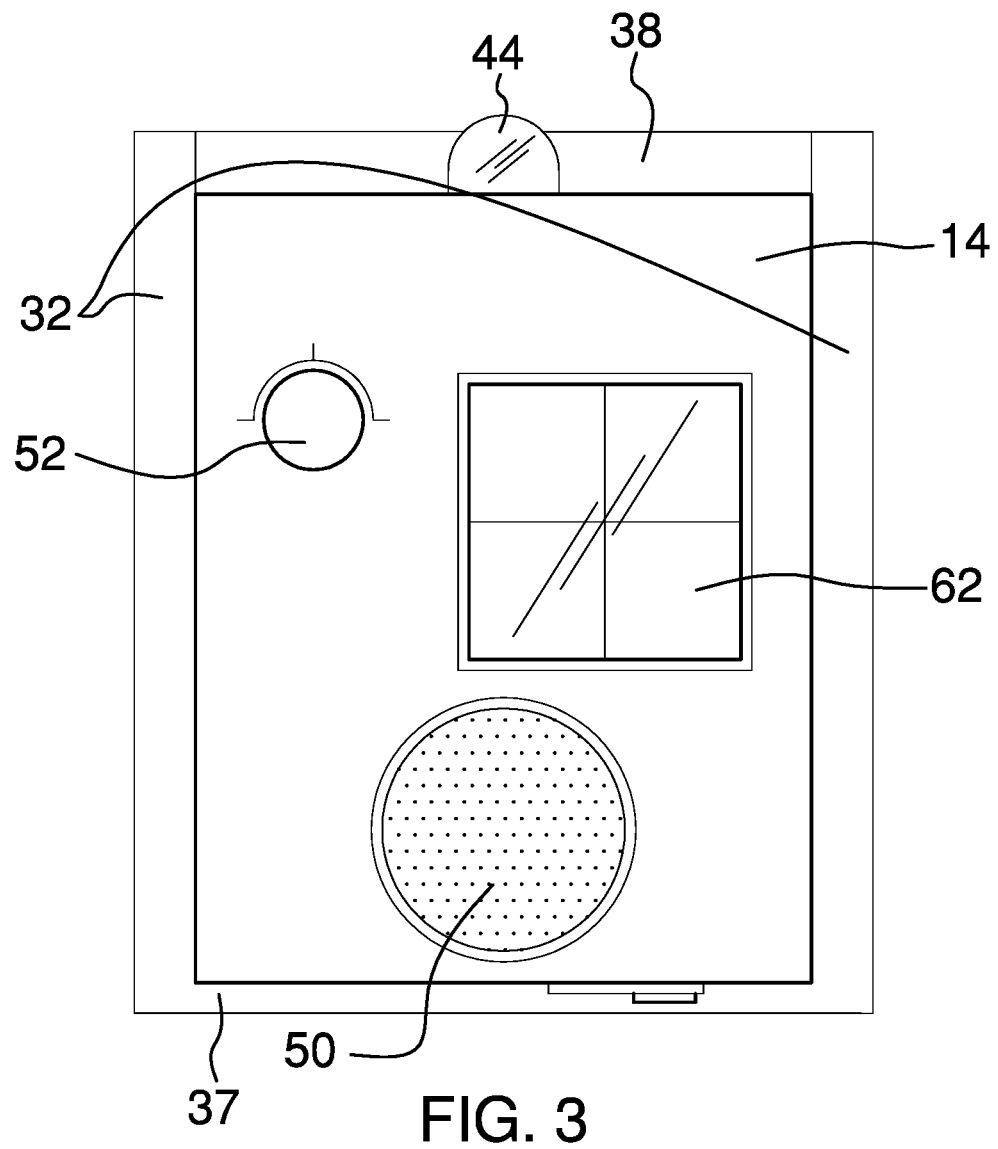
FIG. 3 is a front plan view of an embodiment of the disclosure.
Figure 4:
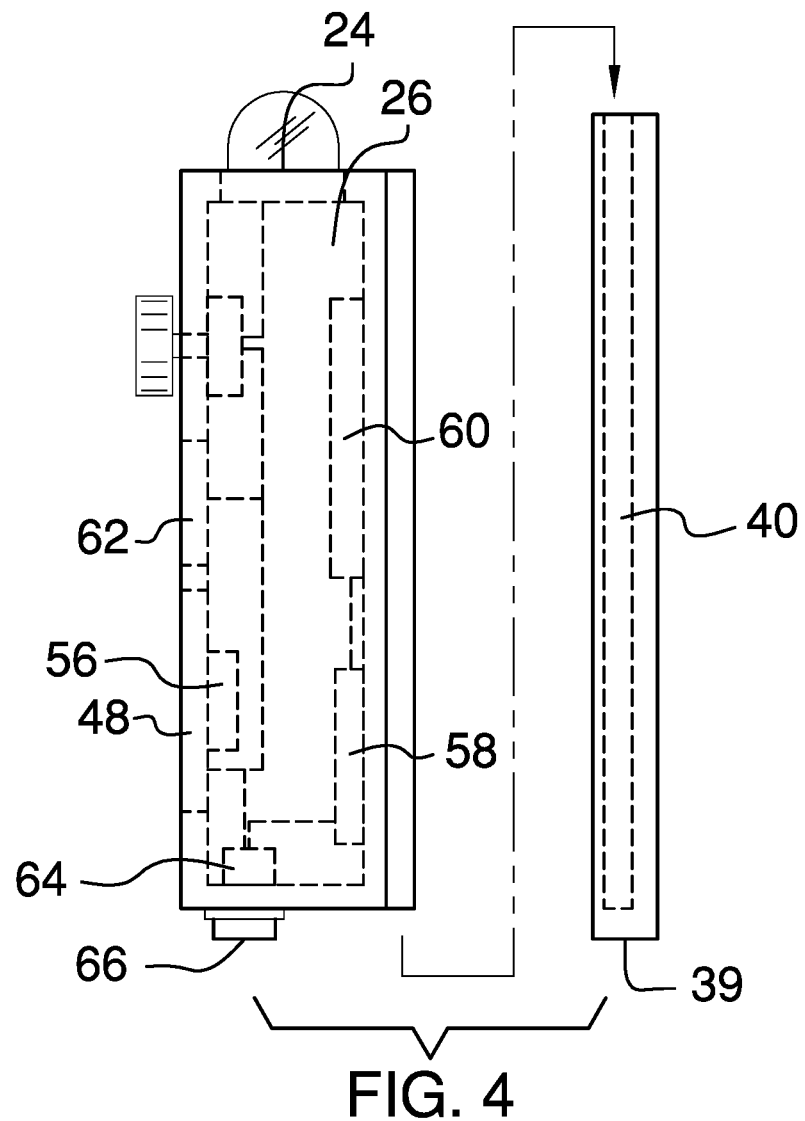
FIG. 4 is a side elevation view of an embodiment of the disclosure.
Figure 5:
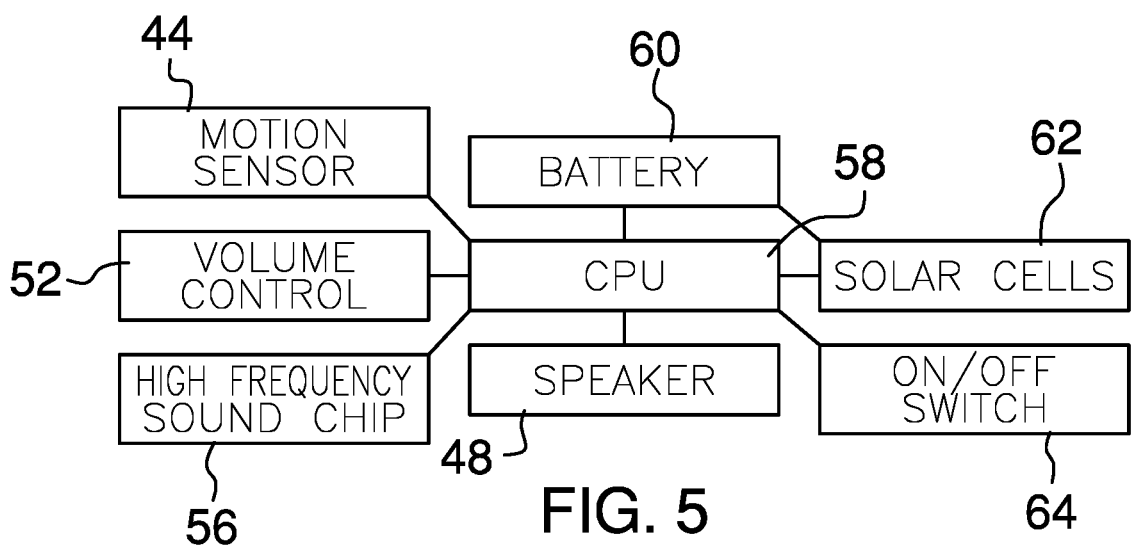
FIG. 5 is a block diagram of an embodiment of the disclosure.

With reference now to the drawings, and in particular to FIGS. 1 through 6 thereof, a new bird deterrent embodying the principles and concepts of an embodiment of the disclosure and generally designated by the reference numeral 10 will be described.

As best illustrated in FIGS. 1 through 6, the sonic bird deterrent apparatus 10 generally comprises a housing 12 having a front side 14 separated from a rear side 16, a right side 18 separated from a left side 20, and a top side 22 separated from a bottom side 24 forming an inside 26. A pair of rails 28 is coupled to the right side 18 and the left side 20 adjacent the rear side 16. A mounting bracket 30 has a pair of perpendicular extensions 32 extending from a left edge 33 and a right edge 34. Each of the pair of perpendicular extensions 32 has an inner groove 36 corresponding to a footprint of the pair of rails 28. There may be a bottom lip 37 extending between the pair of perpendicular extensions 32 along a bottom edge 39. The inner groove 36 of each of the pair of perpendicular extensions and a front surface 38 of the mounting bracket define a track 40 to slidingly receive the pair of rails 28 and the housing 12. The mounting bracket 30 has a plurality of mounting apertures 42 configured to receive a plurality of fasteners to mount to a house exterior or a tree. A motion sensor 44 is coupled through the top side 22 of the housing and has a 180° viewing angle. The motion sensor 44 may have a dome shaped cover 46. A speaker 48 has a round speaker grille 50 coupled through the front side 14 of the housing. A volume control 52 has a control knob 54 coupled to the front side 14 of the housing. The volume control 52 is in operational communication with the speaker 38. A high frequency sound chip 56 is coupled within the inside 26 of the housing and is in operational communication with the speaker 48. A CPU 58 is coupled within the inside 26 of the housing and is in operational communication with each of the motion sensor 44, the speaker 48, the volume control 52, and the high frequency sound chip 56 to produce a high frequency sound from the speaker 48 when the motion sensor 44 detects movement. A battery 60 is coupled within the inside 26 of the housing and is in operational communication with the CPU 58. There may be a solar panel 62 coupled to the front side 14 of the housing and in operational communication with the battery 60 to provide power thereto. A power switch 64 is coupled to the housing 12 and may comprise a slider switch 66 coupled to the bottom side 24 of the housing. The power switch 64 is in operational communication with the battery 60.

In use, the mounting bracket 30 is mounted to the house exterior or the tree and the housing 12 is engaged with the mounting bracket 30. The power switch 64 is then turned on and the volume control 52 adjusted as desired. When a bird comes within range of the motion sensor 44 the speaker 48 produces the high frequency sound to scare away the bird.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sonic bird deterrent apparatus comprising:
   a housing having a front side separated from a rear side, a right side separated from a left side, and a top side separated from a bottom side forming an inside;
   a pair of rails coupled to the housing, the pair of rails being coupled to the right side and the left side adjacent the rear side;
   a mounting bracket, the mounting bracket having a track to slidingly receive the pair of rails and the housing, the mounting bracket having a plurality of mounting apertures configured to receive a plurality of fasteners to mount to a house exterior or a tree;
   a motion sensor coupled to the housing, the motion sensor being coupled through the top side of the housing and having a 180° view;
   a speaker coupled to the housing;
   a volume control coupled to the housing, the volume control being in operational communication with the speaker;
   a high frequency sound chip coupled to the housing, the high frequency sound chip being in operational communication with the speaker;
   a CPU coupled to the housing, the CPU being coupled within the inside of the housing, the CPU being in operational communication with each of the motion sensor, the speaker, the volume control, and the high frequency sound chip to produce a high frequency sound from the speaker when the motion sensor detects movement;
   a battery coupled to the housing, the battery being coupled within the inside of the housing, the battery being in operational communication with the CPU; and
   a power switch coupled to the housing, the power switch being in operational communication with the battery.

2. The sonic bird deterrent apparatus of claim 1 further comprising a solar panel coupled to the housing, the solar panel being coupled to the front side, the solar panel being in operational communication with the battery to provide power thereto.

3. The sonic bird deterrent apparatus of claim 1 further comprising the volume control having a control knob coupled to the front side of the housing.

4. The sonic bird deterrent apparatus of claim 1 further comprising the speaker having a round speaker grille coupled through the front side of the housing.

5. The sonic bird deterrent apparatus of claim 1 further comprising the motion sensor having a dome shaped cover.

6. The sonic bird deterrent apparatus of claim 1 further comprising the mounting bracket having a pair of perpendicular extensions extending from a left edge and a right edge, each of the pair of perpendicular extensions having an inner groove corresponding to a footprint of the pair of rails, the inner groove of each of the pair of perpendicular extensions and a front surface of the mounting bracket defining the track to receive the pair of rails and the housing.

7. The sonic bird deterrent apparatus of claim 6 further comprising the mounting bracket having a bottom lip extending between the pair of perpendicular extensions along a bottom edge.

8. The sonic bird deterrent apparatus of claim 1 further comprising the power switch being a slider switch coupled to the bottom side of the housing.

9. A sonic bird deterrent apparatus comprising:
   a housing having a front side separated from a rear side, a right side separated from a left side, and a top side separated from a bottom side forming an inside;
   a pair of rails coupled to the housing, the pair of rails being coupled to the right side and the left side adjacent the rear side;
   a mounting bracket, the mounting bracket having a pair of perpendicular extensions extending from a left edge and a right edge, each of the pair of perpendicular extensions having an inner groove corresponding to a footprint of the pair of rails, a bottom lip extending between the pair of perpendicular extensions along a bottom edge, the inner groove of each of the pair of perpendicular extensions and a front surface defining a track to slidingly receive the pair of rails and the housing, the mounting bracket having a plurality of mounting apertures configured to receive a plurality of fasteners to mount to a house exterior or a tree;
   a motion sensor coupled to the housing, the motion sensor being coupled through the top side of the housing and having a 180° view, the motion sensor having a dome shaped cover;

a speaker coupled to the housing, the speaker having a round speaker grille coupled through the front side of the housing;

a volume control coupled to the housing, the volume control having a control knob coupled to the front side of the housing, the volume control being in operational communication with the speaker;

a high frequency sound chip coupled to the housing, the high frequency sound chip being in operational communication with the speaker;

a CPU coupled to the housing, the CPU being coupled within the inside of the housing, the CPU being in operational communication with each of the motion sensor, the speaker, the volume control, and the high frequency sound chip to produce a high frequency sound from the speaker when the motion sensor detects movement;

a battery coupled to the housing, the battery being coupled within the inside of the housing, the battery being in operational communication with the CPU;

a solar panel coupled to the housing, the solar panel being coupled to the front side, the solar panel being in operational communication with the battery to provide power thereto; and a power switch coupled to the housing, the power switch being a slider switch coupled to the bottom side of the housing, the power switch being in operational communication with the battery.

* * * * *